US008510740B2

(12) United States Patent
Salsbery et al.

(10) Patent No.: US 8,510,740 B2
(45) Date of Patent: Aug. 13, 2013

(54) SYSTEM AND METHOD OF PERFORMING DYNAMIC VOLTAGE AND FREQUENCY SCALING OPERATIONS ON A MOBILE DEVICE

(75) Inventors: Brian J. Salsbery, Boulder, CO (US); Norman S. Gargash, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 12/883,426

(22) Filed: Sep. 16, 2010

(65) Prior Publication Data

US 2012/0072919 A1    Mar. 22, 2012

(51) Int. Cl.
*G06F 9/46* (2006.01)
*G06F 11/30* (2006.01)
*G06F 9/00* (2006.01)
*G06F 1/00* (2006.01)

(52) U.S. Cl.
USPC ........... 718/102; 718/100; 702/182; 702/186; 713/1; 713/2; 713/300; 713/322

(58) Field of Classification Search
None
See application file for complete search history.

(56) References Cited

U.S. PATENT DOCUMENTS

| | | | |
|---|---|---|---|
| 6,681,336 B1 | 1/2004 | Nakazato et al. | |
| 6,711,447 B1 | 3/2004 | Saeed | |
| 7,082,521 B1 | 7/2006 | Nanja | |
| 7,093,147 B2 * | 8/2006 | Farkas et al. | 713/320 |
| 7,706,844 B2 | 4/2010 | Ranta | |
| 2003/0199997 A1 | 10/2003 | Gao | |
| 2004/0030942 A1 | 2/2004 | Barr et al. | |
| 2004/0139302 A1 | 7/2004 | Flautner et al. | |
| 2007/0245163 A1 | 10/2007 | Lu et al. | |
| 2009/0089782 A1 | 4/2009 | Johnson et al. | |
| 2009/0254767 A1 | 10/2009 | Ford et al. | |
| 2009/0276649 A1 | 11/2009 | Hamilton, II et al. | |

OTHER PUBLICATIONS

Albonesi et al., Dynamically Tuning Processor Resources with Adaptive Processing; IEEE Computer Society, Dec. 2003.*
Hotta Y. et al., "Profile-based Optimization of Power Performance by Using Dynamic Voltage Scaling on a PC Cluster," Proceedings of the 20th I.E.E.E. International Parallel and Distributed Processing Symposium (IPDPS), Rhodes Island, Greece, Apr. 2006, 8 pp.
International Search Report and Written Opinion—PCT/US2011/043285, ISA/EPO—Oct. 20, 2011.
Wonyoung Kim, Meeta S. Gupta, Gu-Yeon Wei and David Brooks, "System Level Analysis of Fast, Per-Core DVFS using On-Chip Switching Regulators." IEEE International Symposium on High-Performance Computer Architecture (HPCA), Feb. 2008.

* cited by examiner

*Primary Examiner* — Jennifer To
*Assistant Examiner* — Bing Zhao
(74) *Attorney, Agent, or Firm* — Nicholas A. Cole (57) ABSTRACT

A mobile device, a method for managing and exposing a set of performance scaling algorithms on the device, and a computer program product are disclosed. The mobile device includes a multiple-core processor communicatively coupled to a non-volatile memory. The non-volatile memory includes a set of programs defined by a respective combination of a performance scaling algorithm and a set of parameters, a startup program that when executed by the multiple-core processor identifies at least one member of the set of programs suitable for monitoring operation of the mobile device and scaling the performance of an identified processor core and an application programming interface that exposes the set of programs.

21 Claims, 4 Drawing Sheets

SYSTEM AND METHOD OF PERFORMING DYNAMIC VOLTAGE AND FREQUENCY SCALING OPERATIONS ON A MOBILE DEVICE

DESCRIPTION OF THE RELATED ART

Technological advances in wireless communication protocols, energy storage density, processor performance and efficiency, and an increase in the density of cellular transmitters enabled the introduction of wireless digital networks in the 1990s. As use of second generation mobile devices became more widespread it became clear that the demand for data services which include access to the Internet was growing. The introduction of packet-switching rather than circuit-switching for data transmission with third generation wireless communication systems enabled the increases in data transmission rates required to deliver streaming media to a mobile device.

Today's data network capable mobile devices include high-performance processors to provide a plethora of applications to the end user. However, the demand for performance results in a corresponding increase in power consumption. The power dissipation in modern processors is rapidly increasing as both clock frequency and the number of transistors required for a given implementation increase. Unfortunately, battery technology has not kept pace with the energy requirements of these data network capable wireless devices, which leads to a design trade-off between application performance and battery life. Even when it is determined that battery life can be sacrificed for full performance, heat management may become problematic for both the battery and the electronic circuits within the often hand-sized housings.

The demand for processors that provide high performance and low power consumption has led to the use of dynamic voltage and frequency scaling (DVFS) into processor designs. DVFS enables trade-offs between power consumption and performance. Processors designed to take advantage of DVFS allow the clock frequency of the processor to be adjusted with a corresponding adjustment in voltage. Reducing clock frequency alone is not useful, since any power savings is offset by an increase in execution time, resulting in no net reduction in the total energy consumed. However, a reduction in operating voltage results in a proportional savings in power consumed.

The central issue for DVFS enabled processors is how to control the balance between performance and power savings. A conventional DVFS control algorithm uses a measure of idle time to identify a modified performance level that permits a projected workload to be stretched in time to a deadline. That is, idle time is reduced by operating the processor at a lower voltage and slower clock frequency. While this approach may be appropriate for a continuous and known workload, many mobile device applications are interactive and/or place irregular or unpredictable demands on the processor. Thus, it is apparent that no one algorithm is optimal for all mobile device applications, application combinations and uses.

SUMMARY OF THE DISCLOSURE

A method for managing and exposing a set of performance scaling algorithms on a mobile device includes the steps of providing a set of performance scaling algorithms to a non-volatile memory within the mobile device, identifying a set of parameters appropriate for each of the respective members of the set of performance scaling algorithms, associating the set of parameters with the respective member of the set of performance scaling algorithms in a non-volatile memory to define a set of programs, identifying at least one member of the set of programs suitable for scaling the performance of an identified processor core, associating the at least one member of the set of programs with the identified processor core in the non-volatile memory and creating an interface that exposes the set of programs.

An alternative embodiment of the method for managing and exposing a set of performance scaling algorithms on a mobile device includes the steps of providing a set of performance scaling algorithms to a non-volatile memory within the mobile device, wherein providing a set of performance scaling algorithms comprises providing power saving algorithms while minimizing performance impact on the mobile device identifying a set of parameters appropriate for each of the respective members of the set of performance scaling algorithms, associating the set of parameters with the respective member of the set of performance scaling algorithms in a non-volatile memory to define a set of programs, identifying at least one member of the set of programs suitable for scaling the performance of an identified processor core, associating the at least one member of the set of programs with the identified processor core in the non-volatile memory and creating an interface that exposes the set of programs.

Still another alternative embodiment of a method for managing and exposing a set of performance scaling algorithms on a mobile device includes the steps of providing a set of performance scaling algorithms to a non-volatile memory within the mobile device, identifying a set of parameters appropriate for each of the respective members of the set of performance scaling algorithms, associating the set of parameters with the respective member of the set of performance scaling algorithms in a non-volatile memory to define a set of programs, identifying at least one member of the set of programs suitable for scaling the performance of an identified processor core, associating the at least one member of the set of programs with the identified processor core in the non-volatile memory, creating an interface that exposes the set of programs and selecting a first program from the set of programs to execute at startup.

Still another alternative embodiment of a method for managing and exposing a set of performance scaling algorithms on a mobile device includes the steps of providing a set of performance scaling algorithms to a non-volatile memory within the mobile device, identifying a set of parameters appropriate for each of the respective members of the set of performance scaling algorithms, associating the set of parameters with the respective member of the set of performance scaling algorithms in a non-volatile memory to define a set of programs, identifying at least one member of the set of programs suitable for scaling the performance of an identified processor core, associating the at least one member of the set of programs with the identified processor core in the non-volatile memory, creating an interface that exposes the set of programs, selecting a first program from the set of programs to execute at startup and replacing the first program with a second program upon the identification of a defined event.

According to another aspect of the method for managing and exposing a set of performance scaling algorithms on a mobile device, the method further includes the step of arranging the set of programs in a hierarchical order. In some embodiments the hierarchical order is structured from the most detailed members to the least detailed members.

According to an aspect of the various methods for managing and exposing a set of performance scaling algorithms on a mobile device, the interface is accessible by one or more of a manufacturer and an operator of the mobile device.

According to another aspect, a mobile device is disclosed. The mobile device includes a multiple-core processor communicatively coupled to a non-volatile memory. The non-volatile memory has stored therein a set of programs defined by a respective combination of a performance scaling algorithm and a set of parameters, a startup program that when executed by the multiple-core processor identifies at least one member of the set of programs suitable for monitoring operation of the mobile device and scaling the performance of an identified processor core and an application programming interface that exposes the set of programs.

In some example embodiments, the mobile device is one of a cellular telephone, a pager, a personal digital assistant, a reader, a satellite phone, a navigation device, or a computing device with a wireless connection.

In an example embodiment, the mobile device includes a performance scaling algorithm that balances a load across multiple processor cores.

In an alternative embodiment, the mobile device further includes a management application that when executed by a processor detects the occurrence of an event, identifies a second member of the set of programs to replace the at least one member of the set of programs responsive to the event, loads the second member for execution in the identified processor core and directs the identified processor core to execute the second member of the set of programs.

According to another aspect of the mobile device, the application programming interface is accessible by one or more of a manufacturer and an operator of the mobile device.

According to still another aspect of the mobile device, the non-volatile memory stores the set of programs in a hierarchical order. In some embodiments the hierarchical order is structured from the most detailed members to the least detailed members.

Moreover, a mobile device that manages a set of performance scaling algorithms operative on the mobile device includes mechanisms for associating and storing a set of performance scaling algorithms with a respective set of parameters to define a set of programs at least one member of the set of programs suitable for scaling the performance of an identified processor core, the mechanisms for associating and storing including a respective indicator for identifying members of the set of programs suitable for execution on processor cores available on the mobile device and mechanisms for exposing the set of programs.

According to another aspect of the mobile device that manages a set of performance scaling algorithms, one or more of the performance scaling algorithms includes a load-balancing algorithm.

According to still another aspect of the mobile device that manages a set of performance scaling algorithms, the mobile device further includes one or more mechanisms for detecting the occurrence of an event, one or more mechanisms for identifying a second member of the set of programs to replace the at least one member of the set of programs responsive to the event and one or more mechanisms for loading and executing the second member.

According to still another aspect of the mobile device that manages a set of performance scaling algorithms, one or more mechanisms for exposing exposes the set of programs to one or more of a manufacturer and an operator of the mobile device.

According to still another aspect of the mobile device that manages a set of performance scaling algorithms, the one or more mechanisms for associating and storing arranges the set of programs in a hierarchical order. In some embodiments the hierarchical order is structured from the most detailed members to the least detailed members.

In still another aspect, a computer program product is disclosed that includes a computer-usable medium having a computer-readable program code embodied therein. The computer-readable program code is adapted to execute and to implement a method for managing a set of performance scaling algorithms on a mobile device. The method includes the steps of selecting a member from a set of programs suitable for scaling the performance of a processor core operable on the mobile device to define a select program, the set of programs defined by a respective combination of a performance scaling algorithm and a respective set of parameters, loading the select program in a processor operable on the mobile device in response to a startup sequence, monitoring use of the mobile device to identify a condition indicative that a replacement program from the set of programs is to replace the select program and replacing the select program with the replacement program during run time.

According to another aspect of the computer program product, the method for managing a set of performance scaling algorithms on a mobile device and specifically selecting a member includes searching a hierarchically arranged file system.

According to still another aspect of the computer program product, the method for managing a set of performance scaling algorithms on a mobile device and specifically the step of monitoring use of the mobile device includes maintaining a list of active processes.

According to still another aspect of the computer program product, the method for managing a set of performance scaling algorithms on a mobile device and specifically the step of monitoring use of the mobile device includes maintaining a list of active resources.

According to still another aspect of the computer program product, the method for managing a set of performance scaling algorithms on a mobile device and specifically the step of monitoring use of the mobile device includes receiving an input from an operator interface.

BRIEF DESCRIPTION OF THE DRAWINGS

The mobile device and methods for exposing and managing a set of performance scaling algorithms operable on the same can be better understood with reference to the following figures. The components within the figures are not necessarily to scale, emphasis instead being placed upon clearly illustrating the principles of managing a set of programs including the algorithms and respective run-time parameters. Moreover, in the figures, like reference numerals designate corresponding parts throughout the different views.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

In this description, the term "mobile device" is used to describe any device operating on a limited capacity power supply, such as a battery. Although battery operated mobile devices have been in use for decades, technological advances in rechargeable batteries coupled with the advent of third generation ("3G") wireless technology, have enabled numerous mobile devices with multiple capabilities. Therefore, a mobile device could be a cellular telephone, a satellite telephone, a pager, a PDA, a smartphone, a navigation device, a smartbook or reader, a media player, a combination of the aforementioned devices, a laptop computer with a wireless connection, among others.

The introduction of multiple-core processors and dedicated hardware resources for implementing various functions on a mobile device and a continuing desire for improvement in battery life has further complicated the task of dynamically adjusting a mobile device to reduce power consumption while providing an acceptable end-user experience. In response, an improved mobile device and methods for managing and exposing multiple performance scaling algorithms are disclosed. The number of different mobile devices available, the various communication protocols or standards used to communicate with the devices, the different types of applications available, the different ways that the devices are used, etc., make it clear that no single approach or solution can be adjusted or optimized for all possible operational combinations.

In response, it is proposed to provide and implement a set of performance scaling algorithms on a mobile device. The availability of the set of performance scaling algorithms provides power saving opportunities while minimizing performance impact when select performance scaling algorithms are correctly applied. It is further proposed to expose the set of performance scaling algorithms to the manufacturers of the various mobile devices. It is believed that the manufacturers will be interested in providing select or optimized performance scaling solutions on mobile devices based on desired performance for various use conditions. These manufacturer selected or optimized solutions can be applied at startup. In some situations, manufacturers may be willing to expose performance scaling alternatives to their customers via the respective mobile devices. In these situations, the manufacturer can provide or modify an application programming interface that would enable an end user to fine tune their desired performance vs. battery life tradeoff that can be applied at startup or can provide for a run time selection and replacement of a performance scaling solution in real time. These alternative run time solutions could include a complete disabling of all performance scaling solutions on the mobile device.

The methods for managing and exposing performance scaling algorithms on a mobile device are generally implemented via a combination of software or firmware and hardware. The software and firmware can be stored in a non-volatile memory element coupled to one or more processors operable on the mobile device. The software stored in the non-volatile memory element is communicated to and executed by a suitable instruction execution system (microprocessor). A hardware implementation on a mobile device can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

Figure 1:
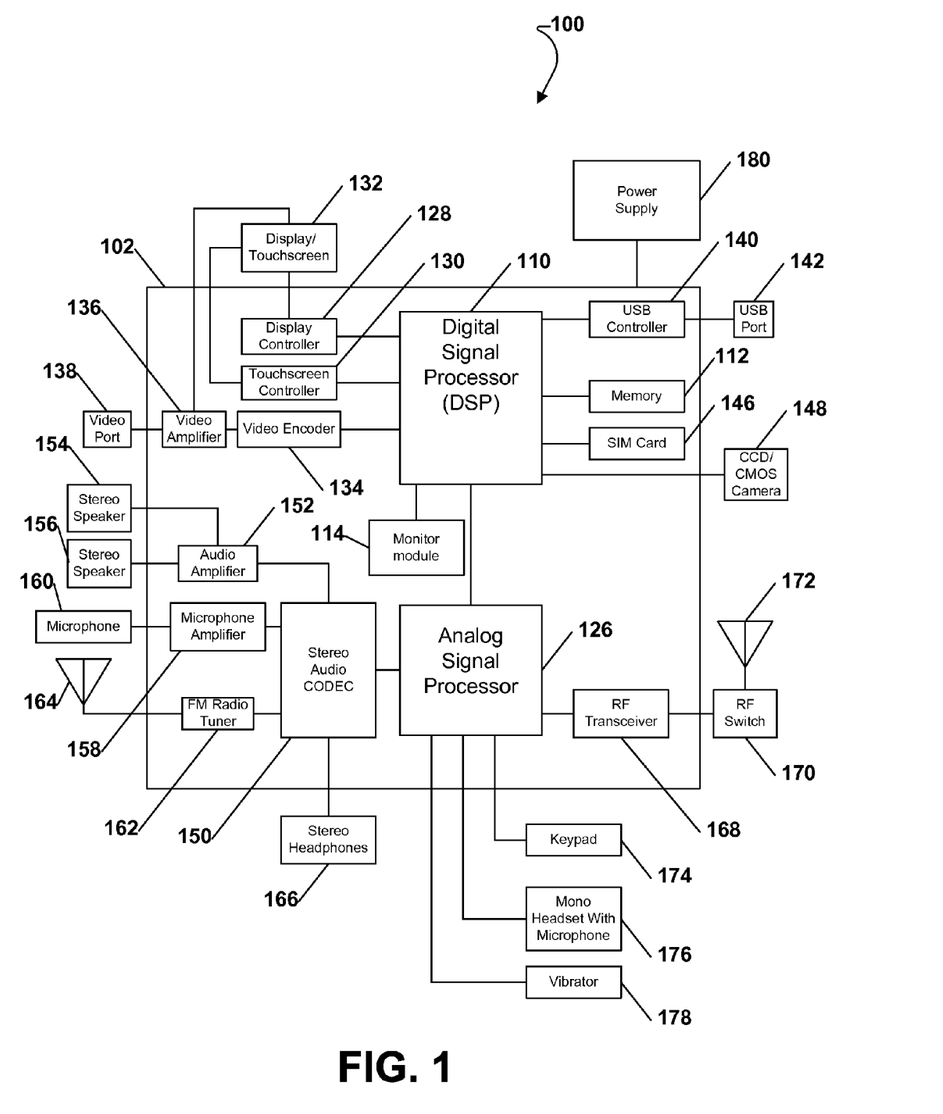
FIG. 1 is a schematic diagram illustrating an embodiment of a mobile device.

Referring to FIG. 1, this figure is a diagram of an exemplary, non-limiting aspect of a mobile device 100 in the form of a wireless telephone. As shown, the mobile device 100 includes an on-chip system 102 that includes a digital signal processor 110 and an analog signal processor 126 that are coupled together. As illustrated in FIG. 1, a display controller 128 and a touchscreen controller 130 are coupled to the digital signal processor 110. A touchscreen display 132 external to the on-chip system 102 is coupled to the display controller 128 and the touchscreen controller 130.

FIG. 1 further indicates that a video encoder 134, e.g., a phase-alternating line ("PAL") encoder, a sequential couleur avec memoire ("SECAM") encoder, a national television system(s) committee ("NTSC") encoder or any other video encoder, is coupled to the digital signal processor 110. Further, a video amplifier 136 is coupled to the video encoder 134 and the touchscreen display 132. A video port 138 is coupled to the video amplifier 136. As depicted in FIG. 1, a universal serial bus ("USB") controller 140 is coupled to the digital signal processor 110. Also, a USB port 142 is coupled to the USB controller 140. A memory 112 and a subscriber identity module (SIM) card 146 may also be coupled to the digital signal processor 110. Further, as shown in FIG. 1, a digital camera 148 may be coupled to the digital signal processor 110. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1 further indicates that a radio frequency ("RF") transceiver 168 may be coupled to the analog signal processor 126. An RF switch 170 may be coupled to the RF transceiver 168 and an RF antenna 172. As shown in FIG. 1, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1 also shows that a power supply 180, for example a battery, is coupled to the on-chip system 102. In a particular aspect, the power supply includes a rechargeable DC battery or a DC power supply that is derived from an alternating current ("AC") to DC transformer that is connected to an AC power source.

FIG. 1 also shows that the mobile device 100 may include a monitor module 114. The monitor module 114 communicates with multiple operational sensors distributed throughout the on-chip system 102 and with the digital signal processor 110 of the mobile device 100. As depicted in FIG. 1, the touchscreen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, and the power supply 180 are external to the on-chip system 322. However, it should be understood that the monitor module 114 may also receive one or more indications or signals from one or more of these external devices by way of the analog signal processor 126 and the digital signal processor 110 to aid in the real time management of the resources operable on the mobile device 100.

In a particular aspect, one or more of the method steps described herein may implemented by executable instructions and parameters stored in the memory 112. These instructions may be executed by the digital signal processor 110, the analog signal processor 126, or another processor, to perform the methods described herein. Further, the processors, 110, 126, the memory 112, the instructions stored therein, or a combination thereof may serve as a means for performing one or more of the method steps described herein.

Figure 2:
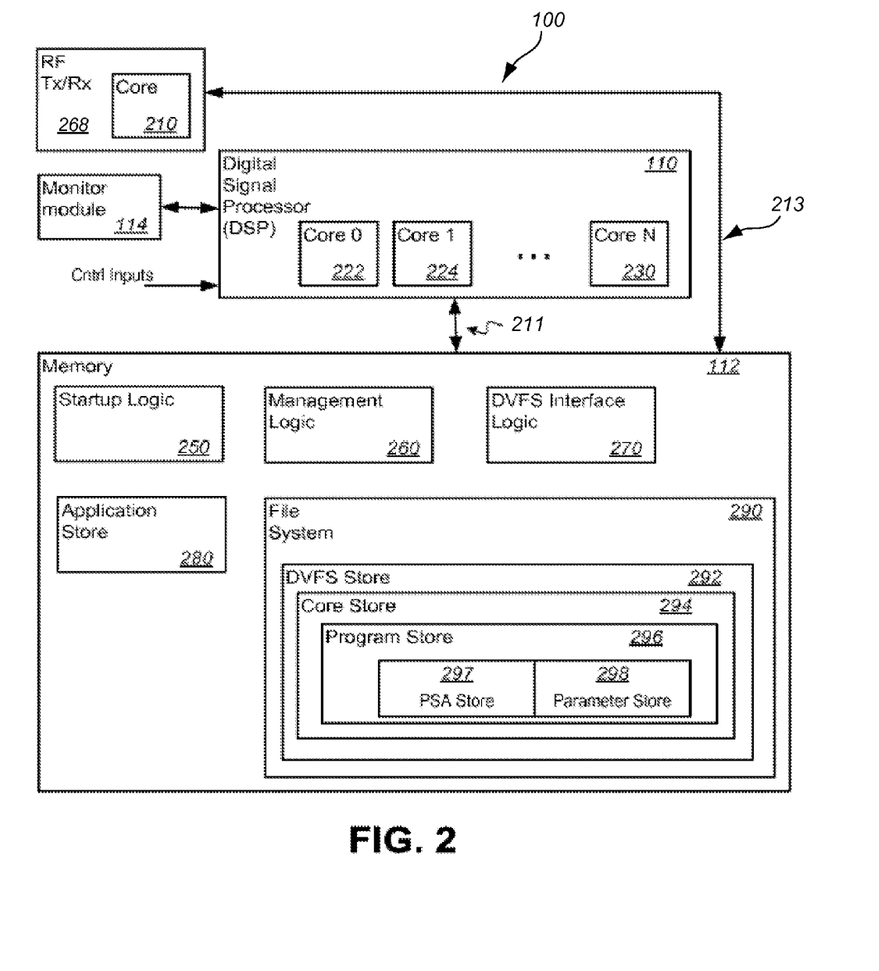
FIG. 2 is a schematic diagram illustrating features of the mobile device of FIG. 1.

FIG. 2 is a schematic diagram illustrating features of the mobile device 100 of FIG. 1. As indicated in FIG. 2, the digital signal processor 110 is coupled to the memory 112 via a bus 211. The digital signal processor 110 is a multiple-core processor having N core processors. That is, the digital signal processor 110 includes a first core 222, a second core 224, and a $N^{th}$ core 230. As is known, each of the first core 222, the second core 224 and the $N^{th}$ core 230 are available for supporting a dedicated application or program. Alternatively, one or more applications or programs can be distributed for processing across two or more of the available cores.

The first core 222, the second core 224 through to the Nth core 230 can be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh and crossbar topologies.

In the illustrated embodiment, the RF transceiver 268 is implemented via digital circuit elements and includes at least one processor such as the core processor 210 (labeled "Core"). In this digital implementation, the RF transceiver 268 is coupled to the memory 112 via bus 213.

Each of the bus 211 and the bus 213 may include multiple communication paths via one or more wired or wireless connections, as is known in the art. The bus 211 and the bus 213 may have additional elements, which are omitted for simplicity, such as controllers, buffers (caches), drivers, repeaters, and receivers, to enable communications. Further, the bus 211 and the bus 213 may include address, control, and/or data connections to enable appropriate communications among the aforementioned components.

When the logic used by the mobile device 100 is implemented in software, as is shown in FIG. 2, it should be noted that one or more of startup logic 250, management logic 260, DVFS interface logic 270, applications in application store 280 and portions of the file system 290 may be stored on any non-transitory computer-readable medium for use by or in connection with any computer-related system or method.

In the context of this document, a computer-readable medium is an electronic, magnetic, optical, or other physical device or means that can contain or store a computer program and data for use by or in connection with a computer-related system or method. The various logic elements and data stores may be embodied in any non-transitory computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable medium" can be any tangible storage media that may be accessed by a computer or a processor, but excludes communication signals, transmissions, and all non-tangible or transitory means that can communicate, propagate, or transport the program.

The non-transitory computer-readable medium can be, for example but not limited to, an electronic, magnetic, optical, electromagnetic, infrared, or semiconductor memory system, apparatus, or device. More specific examples (a non-exhaustive list) of the non-transitory computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CDROM) (optical).

In an alternative embodiment, where one or more of the startup logic 250, management logic 260 and perhaps the DVFS interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor and or the core 210 (or additional processor cores) in the RF transceiver 268.

The startup logic 250 includes one or more executable instructions for selectively identifying, loading, and executing a select program for managing or controlling the performance of one or more of the available cores such as the first core 222, the second core 224 through to the $N^{th}$ core 230. A select program can be found in the program store 296 of the embedded file system 290 and is defined by a specific combination of a performance scaling algorithm 297 and a set of parameters 298. The select program, when executed by one or more of the core processors in the digital signal processor and the core 210 in the RF transceiver 268, may operate in accordance with one or more signals provided by the monitor module 114 to scale the performance of the respective processor core. In this regard, the monitor module 114 may provide one or more indicators of events, processes, applications, resource status conditions, elapsed time, temperature, etc.

The management logic 260 includes one or more executable instructions for terminating an operative performance scaling program on one or more of the respective processor cores, as well as selectively identifying, loading, and executing a more suitable replacement program for managing or controlling the performance of one or more of the available cores. The management logic 260 is arranged to perform these functions at run time or while the mobile device is powered and in use by an operator of the device. A replacement program can be found in the program store 296 of the embedded file system 290 and is defined by a specific combination of a performance scaling algorithm 297 and a set of parameters 298. The replacement program, when executed by one or more of the core processors in the digital signal processor or the core 210 in the RF transceiver 268, may operate in accordance with one or more signals provided by the monitor module 114 or one or more signals provided on the respective control inputs of the various processor cores to scale the performance of the respective processor core. In this regard, the monitor module 114 may provide one or more indicators of events, processes, applications, resource status conditions, elapsed time, temperature, etc.

The DVFS interface logic or interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the management logic 260 that instructs the mobile device 100 to suspend all performance scaling in the RF transceiver 268 when the received signal power falls below an identified threshold. By way of further example, the inputs may include a change to the management logic 260 that instructs the mobile device 100 to apply a desired program when the video codec 134 is active.

The interface logic 270 enables a manufacturer to controllably configure and adjust an end user's experience under defined operating conditions on the mobile device 100. When the memory 112 is a flash memory, one or more of the startup logic 250, the management logic 260, the interface logic 270, the application programs in the application store 280 or information in the embedded file system 290 can be edited, replaced, or otherwise modified. In some embodiments, the interface logic 270 may permit an end user or operator of the mobile device 100 to search, locate, modify or replace the startup logic 250, the management logic 260, applications in the application store 280 and information in the embedded file system 290. The operator may use the resulting interface to make changes that will be implemented upon the next startup of the mobile device 100. Alternatively, the operator may use the resulting interface to make changes that are implemented during run time.

The embedded file system 290 includes a hierarchically arranged DVFS store 292. In this regard, the file system 290 may include a reserved section of its total file system capacity for the storage of information for the configuration and management of the various parameters 298 and performance scaling algorithms 297 used by the mobile device 100. As shown in FIG. 2, the DVFS store 292 includes a core store 294, which includes a program store 296, which includes one or more DVFS programs. Each program is defined as a combination of a respective performance scaling algorithm and a set of parameters associated with the specific algorithm. As a further example of the hierarchical nature of the DVFS store 292, a particular member of a set of files may be located and identified by the path of \startup\core0\algorithm\parameterset. In this example, a program is identified by the algorithm in combination with the contents of information stored in the parameter set. For example, a conventional DVFS algorithm known as "classic" may be identified to manage performance scaling on core0 222 in accordance with the parameters sample rate, samples to increase (listed as "up"), and samples to decrease (listed as "down") as follows: \startup\core0\classic\samplerate, contents 100, where the sample rate is in MHz; \startup\core0\classic\up, contents 2, where the samples to increase is an integer; and \startup\core0\classic\down, contents 1, where the samples to decrease is an integer. That is, the respective file names define a parameter and the value of the parameter is identified by the contents of the file. The algorithm is defined by a periodic sampling of the CPU idle percentage and operates in accordance with a low threshold (% idle) and a high threshold (% idle). If a samples-to-increase threshold comparator indicates for 2 consecutive samples that performance should be increased, the DVFS algorithm increases performance in accordance with a predetermined clock level adjustment. Conversely, if a samples-to-decrease threshold comparator indicates for 1 consecutive sample that performance should be decreased, the DVFS algorithm decreases performance in accordance with the predetermined clock level (i.e., frequency) adjustment. As explained above, processor or core operating voltage may be changed together with changes in the clock frequency.

Alternatively, or additionally, the DVFS store 292 may be arranged such that the operating system encounters the information stored therein in a sequence such that the first information encountered is the most detailed and wherein the last information encountered will be applied as a default should no other program be identified during the search as suitable for scaling performance of the respective processor core on the mobile device 100. For example, parameters could be defined in the directories /core0, /coreall and /default. The paths would be searched in that order for each parameter. The first parameter found will be the one used. The /default location will always have a valid parameter file. The architecture of the individual cores, the architecture of the one or more shared caches and the mechanism(s) used to pass instructions between the cores, as well as the desired use cases for the mobile device 100 are expected to dictate the nature of the various performance scaling algorithms 297 stored in the memory 112.

Figure 3:
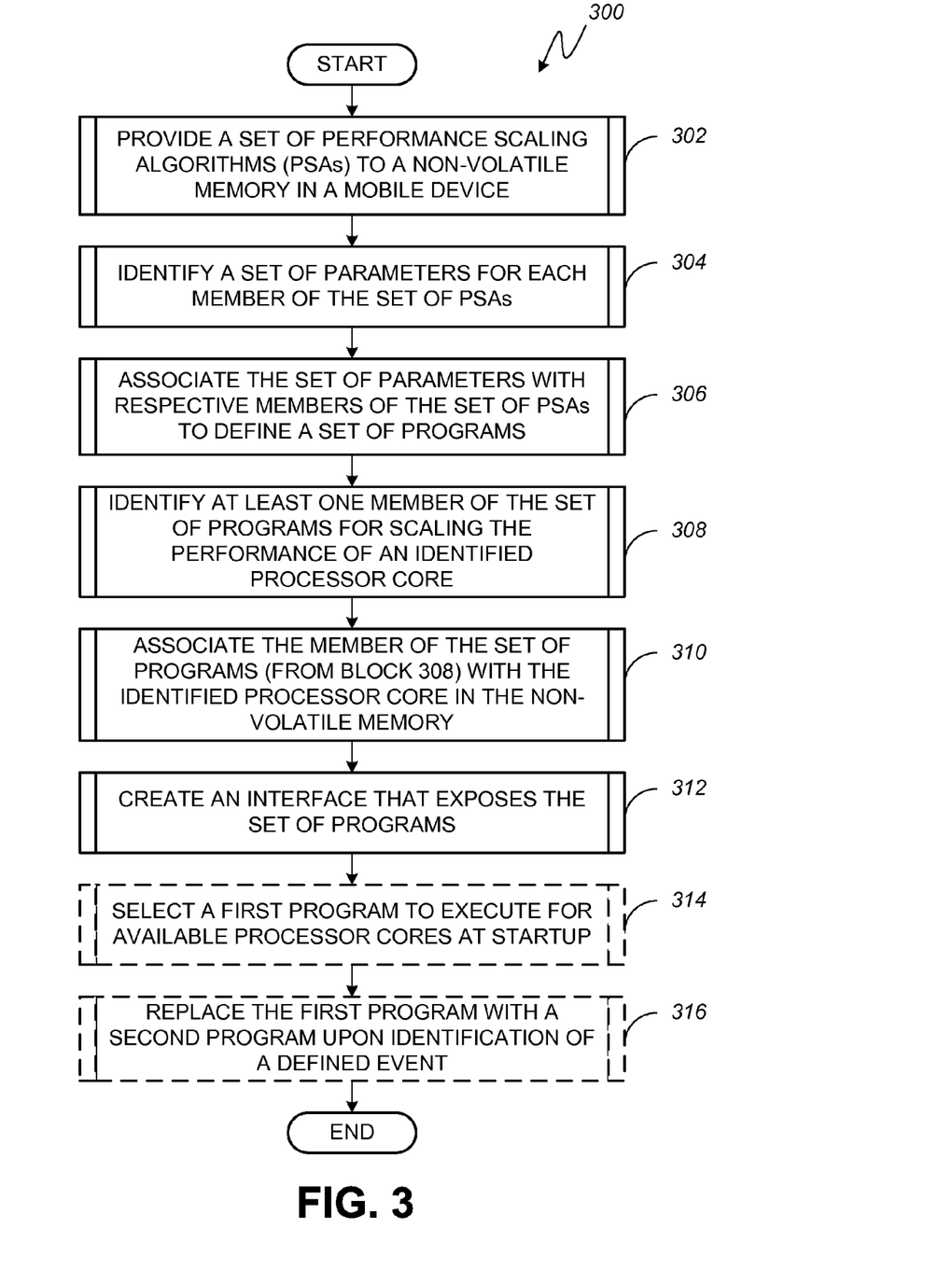
FIG. 3 is a flow chart illustrating an embodiment of a method for managing and exposing performance scaling algorithms operative on the mobile device of FIG. 1.

FIG. 3 is a flow chart illustrating an embodiment of a method 300 for managing and exposing performance scaling algorithms operative on the mobile device 100 of FIG. 1. The method 300 begins with block 302 where a set of performance scaling algorithms are provided in a non-volatile memory such as the memory 112 in the mobile device 100. In block 304, a set of parameters are identified for each member of the set of performance scaling algorithms. Thereafter, as indicated in block 306, the set of parameters are associated with respective members of the set of performance scaling algorithms to define a set of programs. As indicated above, this can be accomplished in a file system such as the file system 290 by establishing a defined sequence for organizing various parameters that can be applied with a specific performance scaling algorithm.

Next, as shown in block 308, at least one member of the set of programs is identified for scaling the performance of an identified processor core. In block 310, the identified processor core and the member of the set of programs identified in block 308 are associated with one another. As indicated above, this can be accomplished in a file system such as the file system 290 by storing or otherwise arranging algorithms and parameters hierarchically under a specified core identifier. In block 312, an interface that exposes the set of programs and the core associations is created. In optional block 314, a first program is selected for execution to implement performance scaling on the available processor cores at startup. This can be accomplished by a search routine that traverses the DVFS store 292 in an attempt to identify an appropriate DVFS program (i.e., a combination of a performance scaling algorithm and a set of parameters) for managing the operation of the respective processor core. Thereafter, as shown in optional block 316, the first program can be replaced during runtime with a second program upon identification of one or more of a defined event, an operating condition, a request for particular hardware resources, application(s), etc.

Figure 4:
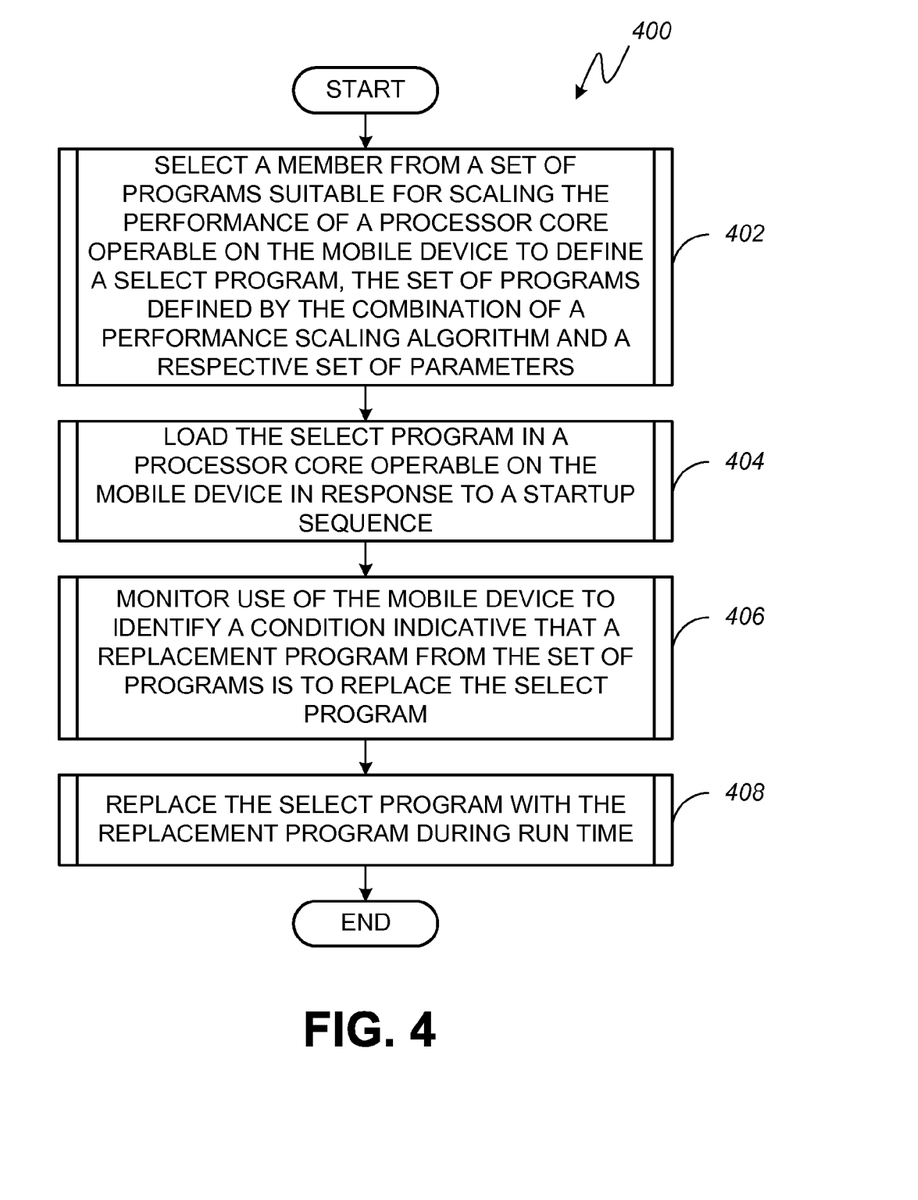
FIG. 4 is a flow chart illustrating an embodiment of a computer program product operable on the mobile device of FIG. 1.

FIG. 4 is a flow chart illustrating an embodiment of a computer program product operable on the mobile device of FIG. 1. The computer program product in some embodiments may encompass the functionality described above in association with the startup logic 250 and the management logic 260. Alternatively, the computer program product may further include aspects of the interface logic 270 and information suitable for populating the DVFS store 292 for a particular mobile device 100.

As illustrated in FIG. 4, example functionality of the computer program product is illustrated in the form of a flow diagram or method 400. The method 400 begins with block 402 where a member from a set of programs suitable for scaling the performance of a processor core operable on the mobile device 100 is selected to define a program. As further illustrated in block 402, the set of programs is defined by a respective combination of a performance scaling algorithm and a respective set of parameters that are applied with the algorithm. In block 404, the select program is loaded or otherwise communicated to a processor core on the mobile device 100. As indicated in block 404, this is accomplished in accordance with a startup sequence. One skilled in the art will understand that the startup sequence can be enabled in firmware, software or even the operating system itself. Once the select program is communicated to the respective processor core, the select program can be executed to scale the performance of the processor core or other processor cores operative on the mobile device 100 as may be desired.

Thereafter, as indicated in block 406, use of the mobile device 100 is monitored to identify a condition indicative that a replacement program from the set of programs is to replace the select program. In block 408, the select program is replaced by the replacement program during run time. As indicated above, the replacement of a select program with a replacement program can be accompanied with a managed termination of the select program before the replacement program is loaded and executed.

Certain steps in the processes or process flows described in this specification naturally precede others for the invention to function as described. However, the invention is not limited to the order of the steps described if such order or sequence does not alter the functionality of the invention. That is, it is recognized that some steps may be performed before, after, or in parallel (substantially simultaneously) with other steps without departing from the scope and spirit of the invention. In some instances, certain steps may be omitted or not performed without departing from the invention. Further, words such as "thereafter," "then," "next," etc., are not intended to limit the order of the steps. These words are simply used to guide the reader through the description of the exemplary method.

One of ordinary skill in the art of programming is able to write computer code or identify appropriate hardware to implement the disclosed processes without undue difficulty or experimentation. Therefore, disclosure of a particular set of executable instructions or detailed hardware devices is not considered necessary for an adequate understanding of how to make and use the invention. The inventive functionality of the claimed mobile device 100 and processes is explained in more detail in the above description and in conjunction with the Figures which may illustrate various process flows.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGs. which may illustrate various process flows.

In one or more exemplary aspects, the functions described may be implemented in hardware, software, firmware, or any combination thereof. If implemented in software, the functions may be stored as one or more instructions or code on a non-transitory computer-readable medium. Non-transitory computer-readable media include computer storage media including any medium that facilitates transfer of a computer program from one place to another. A storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of non-transitory computer-readable media.

Although selected aspects have been illustrated and described in detail, it will be understood that various substitutions and alterations may be made therein without departing from the scope of the present invention, as defined by the following claims.

What is claimed is:

1. A method of performing dynamic voltage and frequency scaling (DVFS) operations on a mobile device that includes a multicore processor, the method comprising:
    applying a default DVFS program to each processor core in the multicore processor to scale an operating frequency of each processor core in the multicore processor;
    receiving in the mobile device via an application programming interface a plurality of DVFS programs;
    identifying for each processor core in the multicore processor at least one DVFS program in the received plurality of DVFS programs that is suitable for scaling the operating frequency of each respective processor core;
    storing each of the identified DVFS programs in the non-volatile memory in association with each respective processor core and in a hierarchical order for each respective processor core;
    traversing the hierarchical order for at least one processing core;
    selecting a first DVFS program encountered when traversing the hierarchical order; and
    applying the selected first DVFS program as part of a startup routine of the mobile device to its respective processor core to scale the operating frequency of the respective processing core.

2. The method of claim 1, further comprising: applying at least one of the stored DVFS programs to its respective processor core to scale the operating frequency of the respective processor core by applying a power saving algorithm configured to reduce power consumption of the processing core without having a user-perceivable performance impact on the mobile device.

3. The method of claim 1, further comprising:
monitoring the mobile device to detect a condition that indicates that the selected first DVFS program should be replaced with a replacement DVFS program; and
replacing the selected first DVFS program with a second DVFS program encountered when traversing the hierarchical order in response to detecting the condition.

4. The method of claim 1, wherein receiving in the mobile device via the application programming interface the plurality of DVFS programs comprises:
receiving the plurality of DVFS programs in one of a cellular telephone, a pager, a personal digital assistant, a reader, a satellite phone, a navigation device, and a computer with a wireless connection.

5. The method of claim 1, wherein receiving in the mobile device via the application programming interface the plurality of DVFS programs comprises:
receiving the plurality of DVFS programs from a manufacturer of the mobile device via the application programming interface.

6. The method of claim 1, wherein receiving in the mobile device via the application programming interface the plurality of DVFS programs comprises:
receiving the plurality of DVFS programs from an operator of the mobile device via the application programming interface.

7. A mobile device, comprising:
a memory; and
a multicore processor coupled to the memory, wherein at least one processor core of the multicore processor is configured with processor-executable instructions to perform operations comprising:
applying a default dynamic voltage and frequency scaling (DVFS) program to at least one processor core of the multicore processor to scale the operating frequency of the processing core to which the default DVFS program is applied;
receiving via an application programming interface a plurality of DVFS programs;
identifying at least one DVFS program in the received plurality of DVFS programs as being suitable for scaling the operating frequency of each respective processor core;
storing each of the identified DVFS programs in the memory in association with its respective processor core and in a hierarchical order for each respective processor core;
traversing the hierarchical order for at least one processing core;
selecting a first DVFS program encountered when traversing the hierarchical order; and
applying the selected first DVFS program as part of a startup routine of the mobile device to its respective processor core to scale the operating frequency of the respective processor core.

8. The mobile device of claim 7, wherein at least one processor core of the multicore processor is configured with processor-executable instructions to perform operations further comprising:
applying at least one of the stored DVFS programs to its respective processor core by applying a power saving algorithm configured to reduce power consumption of the mobile device without having a user-perceivable performance impact on the mobile device.

9. The mobile device of claim 7, wherein at least one processor core of the multicore processor is configured with processor-executable instructions to perform operations further comprising:
detecting a mobile device condition that indicates that the selected first DVFS program should be replaced with a replacement DVFS program; and
replacing the selected first DVFS program with a second DVFS program encountered when traversing the hierarchical order in response to detecting the mobile device condition.

10. The mobile device of claim 7, wherein at least one processor core of the multicore processor is configured with processor-executable instructions to perform operations such that receiving via the application programming interface the plurality of DVFS programs comprises:
receiving the plurality of DVFS programs from a manufacturer of the mobile device via the application programming interface.

11. The mobile device of claim 7, wherein at least one processor core the multicore processor is configured with processor-executable instructions to perform operations such that receiving via the application programming interface the plurality of DVFS programs comprises:
receiving the plurality of DVFS programs from an operator of the mobile device via the application programming interface.

12. A mobile device having a multicore processor, comprising:
means for applying a default dynamic voltage and frequency scaling (DVFS) program to each processor core in the multicore processor to scale an operating frequency of each processing core;
means for receiving via an application programming interface a plurality of DVFS programs;
means for identifying at least one DVFS program in the received plurality of DVFS programs as being suitable for scaling the operating frequency of each respective processor core;
means for storing each of the identified DVFS programs in association with its respective processor core and in a hierarchical order for each the respective processor core;
means for traversing the hierarchical order for at least one processing core;
means for selecting a first DVFS program encountered when traversing the hierarchical order; and
means for applying the selected first DVFS program as part of a startup routine of the mobile device to its respective processor core to scale the operating frequency of the respective processor core.

13. The mobile device of claim 12, further comprising means for applying at least one of the stored DVFS programs to its respective processor core to scale the operating frequency of the respective processor core by applying a power saving algorithm configured to reduce power consumption of the processing core without having a user-perceivable performance impact on the mobile device.

14. The mobile device of claim 12, further comprising:
means for detecting a condition that indicates that the selected first DVFS program should be replaced with a replacement DVFS program; and means for replacing the selected first DVFS program with a second DVFS program encountered when traversing the hierarchical order in response to detecting the condition.

15. The mobile device of claim 12, wherein means for receiving via the application programming interface the plurality of DVFS programs comprises:

means for receiving the plurality of DVFS programs from a manufacturer of the mobile device via the application programming interface.

16. The mobile device of claim 12, wherein means for receiving via the application programming interface the plurality of DVFS programs comprises:

means for receiving the plurality of DVFS programs from an operator of the mobile device via the application programming interface.

17. A non-transitory computer-readable storage medium having stored thereon processor-executable software instructions configured to cause a processing core of a multicore processor of a mobile device to perform operations comprising:

applying a default dynamic voltage and frequency scaling (DVFS) program to at least one processor core in the multicore processor to scale the operating frequency of the processing core to which the default DVFS program is applied;

receiving via an application programming interface a plurality of DVFS programs;

identifying at least one DVFS program in the received plurality of DVFS programs that is suitable for scaling the operating frequency of at least one processor core;

storing each of the identified DVFS programs in association with the processor cores for which they are identified and in a hierarchical order for each of the processor cores for which they are identified;

traversing the hierarchical order;

selecting a first DVFS program encountered when traversing the hierarchical order; and applying the selected first DVFS program as part of a startup routine to its respective processor core to scale the operating frequency of that processing core.

18. The non-transitory computer-readable storage medium of claim 17, wherein the stored processor-executable software instructions are configured to cause the processing core to perform operations further comprising applying at least one of the stored DVFS programs to its respective processor core to scale the operating frequency of that processing core by applying a power saving algorithm configured to reduce power consumption on the mobile device without having a user-perceivable performance impact on the mobile device.

19. The non-transitory computer-readable storage medium of claim 17, wherein the stored processor-executable software instructions are configured to cause the processing core to perform operations further comprising:

detecting a condition that indicates that the selected first DVFS program should be replaced with a replacement DVFS program; and replacing the selected first DVFS program with a second DVFS program encountered when traversing the hierarchical order in response to detecting the condition.

20. The non-transitory computer-readable storage medium of claim 17, wherein the stored processor-executable software instructions are configured to cause the processing core to perform operations such that receiving via the application programming interface the plurality of DVFS programs comprises:

receiving the plurality of DVFS programs from a manufacturer of the mobile device via the application programming interface.

21. The non-transitory computer-readable storage medium of claim 17, wherein the stored processor-executable software instructions are configured to cause the processing core to perform operations such that receiving via the application programming interface the plurality of DVFS programs comprises:

receiving the plurality of DVFS programs from an operator of the mobile device via the application programming interface.

* * * * *